United States Patent
Agrawal et al.

(10) Patent No.: US 11,935,059 B2
(45) Date of Patent: Mar. 19, 2024

(54) SYSTEM TO REDUCE FALSE DECLINES USING SUPPLEMENTAL DEVICES

(71) Applicant: Visa International Service Association, San Francisco, CA (US)

(72) Inventors: Shubham Agrawal, Round Rock, TX (US); Karankumar Hiteshbha Patel, Austin, TX (US); Chiranjeet Chetia, Round Rock, TX (US); Deepam Tiwan, Austin, TX (US); Navendu Misra, Austin, TX (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 285 days.

(21) Appl. No.: 16/428,530

(22) Filed: May 31, 2019

(65) Prior Publication Data

US 2020/0380523 A1 Dec. 3, 2020

(51) Int. Cl.
*G06Q 20/40* (2012.01)
*G06Q 20/32* (2012.01)

(52) U.S. Cl.
CPC ..... *G06Q 20/4016* (2013.01); *G06Q 20/3224* (2013.01); *G06Q 20/3226* (2013.01); *G06Q 20/40145* (2013.01); *G06Q 20/405* (2013.01)

(58) Field of Classification Search
CPC ........... G06Q 20/4016; G06Q 20/3224; G06Q 20/3226; G06Q 20/40145; G06Q 20/405; G06Q 20/40–40975
See application file for complete search history.

(56) References Cited

U.S. PATENT DOCUMENTS

| | | | | |
|---|---|---|---|---|
| 9,521,175 B2 * | 12/2016 | Rogers | ................ | G06F 16/5866 |
| 10,083,443 B1 * | 9/2018 | Steshenko | .......... | G06Q 20/3278 |
| 11,005,839 B1 * | 5/2021 | Shahidzadeh | ........ | G06Q 20/405 |
| 2010/0274572 A1 * | 10/2010 | Hammad | .............. | H04L 67/306 |
| | | | | 709/206 |
| 2011/0275907 A1 * | 11/2011 | Inciardi | .................. | A61B 5/681 |
| | | | | 600/301 |
| 2012/0150671 A1 * | 6/2012 | Mercia | .................... | G06Q 20/20 |
| | | | | 705/16 |

(Continued)

FOREIGN PATENT DOCUMENTS

| | | | | |
|---|---|---|---|---|
| CA | 3024009 A1 * | 2/2018 | ........... | G06Q 20/027 |
| CN | 112514346 A * | 3/2021 | ............. | G06F 21/34 |

*Primary Examiner* — Neha Patel
*Assistant Examiner* — Jahed Ali
(74) *Attorney, Agent, or Firm* — Kilpatrick Townsend & Stockton LLP

(57) ABSTRACT

Described herein are techniques and systems directed to using context data provided by supplemental devices to reduce false declines during transaction authorization. In some embodiments, upon a transaction being declined based on a level of risk associated with the transaction, a service provider may obtain context data from a number of supplemental devices associated with a user, resource provider, location, or other suitable factor. This context data may then be assessed by the service provider to determine a degree to which the context data supports that the user conducting the transaction is the owner of the account used to conduct the transaction. The level of risk may then be adjusted based on that degree and the adjusted level of risk is used to determine whether to approve or decline the transaction.

17 Claims, 6 Drawing Sheets

(56) References Cited

U.S. PATENT DOCUMENTS

| | | | |
|---|---|---|---|
| 2012/0204257 A1* | 8/2012 | O'Connell | G06F 21/316 726/19 |
| 2013/0232073 A1* | 9/2013 | Sheets | G06Q 20/389 705/44 |
| 2014/0164472 A1* | 6/2014 | Cudak | H04L 67/5682 709/202 |
| 2014/0316984 A1 | 10/2014 | Schwartz | |
| 2014/0337243 A1 | 11/2014 | Dutt et al. | |
| 2015/0073907 A1* | 3/2015 | Purves | G06Q 20/384 705/14.58 |
| 2015/0186892 A1* | 7/2015 | Zhang | G06Q 20/326 705/44 |
| 2015/0304851 A1* | 10/2015 | Chen | H04L 63/0853 713/172 |
| 2015/0310444 A1* | 10/2015 | Chen | G06Q 20/308 705/44 |
| 2016/0042168 A1* | 2/2016 | Holland | G06F 21/34 726/7 |
| 2016/0078445 A1* | 3/2016 | Einhorn | G06Q 20/325 705/44 |
| 2016/0127900 A1* | 5/2016 | John Archibald | G06F 21/32 726/7 |
| 2016/0140567 A1* | 5/2016 | Hanna | G06Q 20/40145 705/44 |
| 2016/0162900 A1* | 6/2016 | Dutt | G06Q 20/386 705/44 |
| 2016/0196558 A1* | 7/2016 | Mercille | G06Q 20/3278 705/44 |
| 2016/0203467 A1* | 7/2016 | Khan | G06Q 20/353 705/39 |
| 2016/0247156 A1* | 8/2016 | Hwang | G06Q 20/405 |
| 2017/0132613 A1* | 5/2017 | Tunnell | G06F 21/6245 |
| 2017/0235882 A1* | 8/2017 | Orlov | G06Q 10/105 705/2 |
| 2017/0339151 A1* | 11/2017 | Van Os | G06Q 20/12 |
| 2018/0012227 A1* | 1/2018 | Tunnell | G06Q 20/4014 |
| 2018/0025356 A1* | 1/2018 | Maheshwari | G06Q 20/4016 705/39 |
| 2018/0082304 A1* | 3/2018 | Summerlin | G06N 3/08 |
| 2018/0332036 A1* | 11/2018 | Mokhasi | G06Q 20/321 |
| 2019/0139025 A1* | 5/2019 | Jackson | G06Q 20/387 |
| 2020/0007536 A1* | 1/2020 | Piel | H04L 63/102 |
| 2020/0153821 A1* | 5/2020 | Cao | G06Q 20/4016 |
| 2020/0167783 A1* | 5/2020 | Bermudez | G06Q 20/4016 |
| 2020/0175767 A1* | 6/2020 | Stivi | G08B 25/10 |

* cited by examiner

SYSTEM TO REDUCE FALSE DECLINES USING SUPPLEMENTAL DEVICES

BACKGROUND

When determining whether to approve or decline transactions, authorization entities are forced to walk a delicate line between providing convenience to their users and protecting themselves from potential fraud. For each transaction, those authorization entities determine a risk of fraud and whether the authorization entity is willing to accept that risk. This typically results in the authorization entity declining transactions that are uncharacteristic of a user. However, the tendency to decline transactions in this manner can be inconvenient and embarrassing for a user who is attempting to complete the transaction. Hence, users are likely to abandon authorization entities which frequently falsely decline their transactions.

Embodiments of the present invention address these problems and other problems, individually and collectively.

SUMMARY

Described herein are techniques and systems directed to using context data provided by supplemental devices in order to reduce false declines during transaction authorization. In particular, an authorization entity is configured to determine whether to approve or alternatively provisionally decline a transaction based on a level of risk representing a likelihood that the transaction is characteristic of a user conducting the transaction. Upon a transaction being provisionally declined, the authorization entity may obtain context data from a number of supplemental devices associated with a user, resource provider, location, or other suitable factor. This context data is then assessed by the authorization entity to determine a degree to which the context data supports that the user conducting the transaction is the owner of the account used to conduct the transaction. The level of risk is then adjusted based on that degree and the adjusted level of risk is used to determine whether to approve or decline the transaction.

One embodiment of the invention is directed to a method comprising maintaining an association between one or more supplemental devices and a user device, the one or more supplemental devices configured to provide biometric information associated with a user of the user device, receiving, at the service provider, an authorization request message associated with a transaction, determining, based on the authorization request message, a level of risk associated with the transaction, upon determining that the level of risk is greater than a threshold value: obtaining context data from the one or more supplemental devices that corresponds to a time of the transaction, determining a degree to which the context data supports an authenticity of the user, adjusting the level of risk by the degree to which the context data supports the authenticity of the user, and approving the transaction if the adjusted level of risk is less than the threshold value.

Another embodiment of the invention is directed to a service provider computer comprising: a processor; and a memory including instructions that, when executed with the processor, cause the service provider computer to, at least: maintain an association between one or more supplemental devices and a user device, the one or more supplemental devices configured to provide biometric information associated with a user of the user device, receive an authorization request message associated with a transaction, determine, based on the authorization request message, a level of risk associated with the transaction, upon determining that the level of risk is greater than a threshold value: obtain context data from the one or more supplemental devices that corresponds to a time of the transaction, determine a degree to which the context data supports an authenticity of the user, adjust the level of risk by the degree to which the context data supports the authenticity of the user, and approve the transaction if the adjusted level of risk is less than the threshold value.

Yet another embodiment of the invention is directed to a method comprising: receiving, by a processor computer, an authorization request message comprising interaction data for an interaction between a user and a resource provider, initially determining, by the processor computer, that the interaction is uncharacteristic for the user, obtaining, by the processor computer, further information regarding the user, the further information obtained using one or more sensors proximate to the user during the interaction, evaluating, by the processor computer, the interaction using the further information, and generating, by the processor computer, an indication of approval of the interaction after evaluating the further information and initially determining that the interaction is uncharacteristic for the user.

Further details regarding embodiments of the invention can be found in the Detailed Description and the Figures.

DETAILED DESCRIPTION

Figure 1:
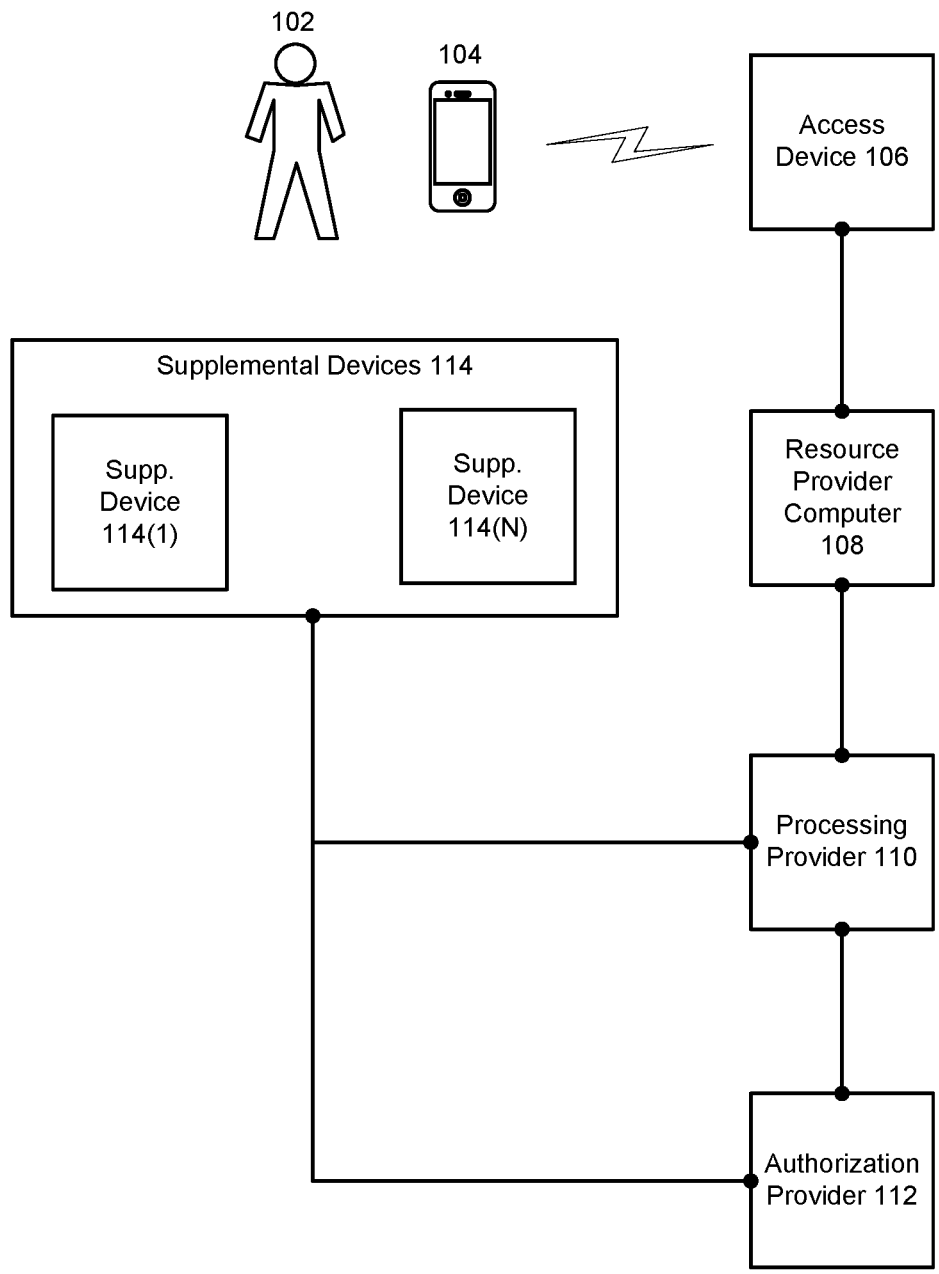
FIG. 1 depicts an illustrative example of a number of components that may be involved in a system for reducing false declines using supplemental devices in accordance with at least some embodiments.

Prior to discussing specific embodiments of the invention, some terms may be described in detail.

An "authorization computer" can include any system involved in authorization of a transaction. The authorization computer may determine whether a transaction can be authorized and may generate an authorization response message including an authorization status (also may be known as an authorization decision). In some embodiments, an authorization computer may be a payment account issuer computer. In some cases, the authorization computer may store contact information of one or more users. In other embodiments, the authorization computer may authorize non-financial transactions involving a user. For example, the authorization computer may make an authorization decision regarding whether the user can access a certain resource (e.g., an electronic document). In some cases, the authorization may be a content provider server computer associated with a content providing entity, which manages one or more resources that may be accessed by the user.

An "authorization request message" may be an electronic message that is sent to a payment processing network and/or an issuer of a payment account to request authorization for a payment transaction. An authorization request message according to some embodiments may comply with ISO 8583, which is a standard for systems that exchange electronic transaction information associated with a payment made by a consumer using a payment device or a payment account. An authorization request message may also comprise additional data elements corresponding to "identification information" including, for example, a service code, a CVV (card verification value), a dCVV (dynamic card verification value), an expiration date, etc. An authorization request message may also comprise "transaction data," such as any information associated with a current transaction (e.g., the transaction amount, merchant identifier, merchant location, etc.) as well as any other information that may be utilized in determining whether to identify and/or authorize a payment transaction.

An "authorization response message" may be an electronic message reply to an authorization request message generated by an issuing financial institution (i.e. issuer) or a payment processing network. The authorization response message may include an authorization code, which may be a code that an account issuing bank returns in response to an authorization request message in an electronic message (either directly or through the payment processing network) to a merchant's access device (e.g., point of sale terminal) that indicates approval of the transaction. The code may serve as proof of authorization. As noted above, in some embodiments, a payment processing network may generate and/or forward the authorization response message to the merchant. In some embodiments, the authorization response message may be associated with confirmation element data by a confirmation element identifier. In some cases, modified confirmation element data may be included in the authorization response message sent to an access device.

"Context data" may include any data that pertains to a context under which an event (e.g., a transaction) takes place. Context data may include any appropriate data that can be used to determine a context for an event, including location information, biometric information, audio information, image information, or any other suitable information. For example, context data may include audio data collected in the vicinity of an event. In another example, context data may include biometric information (e.g., a heart rate, etc.) for a user involved in the event.

A "resource provider" may be an entity that manages access to one or more resources. Examples of resource providers may include merchants, vendors, suppliers, owners, traders, and the like. In some embodiments, such entities may be a single individual, small groups of individuals, or larger groups of individuals (e.g., companies). Resource providers may be associated with one or more physical locations (e.g., supermarkets, malls, stores, etc.) and online platforms (e.g., mobile applications, e-commerce websites, online companies, etc.). In some embodiments, resource providers may make available physical items (e.g., goods, products, etc.) to the user. In other embodiments, resource providers may make available digital resources (e.g., electronic documents, electronic files, etc.) to the user.

A "supplemental device" may be any electronic device known to be associated with either a user, a locale, or a resource provider. A supplemental device may include one or more sensors for obtaining information about an environment in which the supplemental device is located. The supplemental device may further be connected to a network or have some mechanism for communicating with at least one other electronic device. In some embodiments, a supplemental device may be an Internet of Things (IoT) device.

FIG. 1 depicts an illustrative example of a number of components that may be involved in a system for reducing false declines using supplemental devices in accordance with at least some embodiments. In FIG. 1, a user 102 may operate a user device 104 to conduct a transaction with a resource provider. To do this, the user device 104 may be configured to interact with an access device 106 in communication with a resource provider computer 108. The resource provider computer 108 may, in turn, be configured to transmit an authorization request message, via a processing provider 110, to an authorization provider 112. Either or both of the processing provider 110 and authorization provider 112 may be in communication with a number of supplemental devices 114 (1-N), and may use data received from the supplemental devices 114 to reduce or prevent false negatives using techniques described herein.

A user device 104 may include any device associated with a user 102 that can be used to conduct a transaction. In some embodiments, the user device 104 may be a payment device (e.g., a credit card). In some embodiments, the user device 104 may be a mobile device (such as a smart phone) that has payment capabilities. For example, the user device 104 may be a mobile device which has installed a contactless reader (e.g., radio frequency identification (RFID) or near-field communication (NFC)) capable of receiving data from, and communicating access credentials to, an access device 106. In another example, the user device 104 may be capable of displaying, on a display of the user device 104, a machine readable code which can be used to convey data to the access device 106. In yet another example, the user device 104 may include a camera device or machine-readable code reader (e.g., a barcode scanner) capable of obtaining data from a machine-readable code presented by an access device 106. In some embodiments, the user device 104 may be associated with a particular user 102 or account via a relationship stored in a database. One skilled in the art would recognize that any identifier unique to the user device 104 (e.g., a phone number, an international mobile equipment identifier (IMEI), or serial number) may be used to identify a particular user 102 or account associated with a transaction initiated via the user device 104.

A resource provider computer 108 may be any electronic device configured to manage access to one or more resources. The resource provider computer 108 may be a computing device that manages transactions initiated at a physical retail location or initiated electronically (e.g., an online sale). In some embodiments, the resource provider computer 108 may be a point-of-sale (POS) device. The resource provider computer 108 may be in communication with an access device 106 capable of interacting with the user device 104. In some illustrative embodiments, the access device 106 may be a card reader (e.g., a credit card reader), a machine-readable code reader (e.g., a barcode reader), a contactless reader (e.g., an RFID or NFC reader), or any other suitable mechanism for obtaining data from the user device 104.

A processing provider 110 may be any electronic device configured to receive authorization request messages and forward those authorization request messages to an appropriate authorization provider 112. The processing provider 110 may identify an appropriate authorization provider 112 based on a banking identification number (BIN) included in the authorization request message. In some embodiments, the processing provider 110 may be configured to provide at least some authorization functionality. For example, the processing provider 110 may be configured to perform stand-in processing (STIP) when an authorization provider 112 is unavailable. In some embodiments, the processing provider 110 may be configured to obtain context data from one or more supplemental devices 114, which the processing provider 110 may forward to the appropriate authorization provider 112 along with an authorization request message.

An authorization provider 112 may be any electronic device configured to provide authorization (or approval) for a transaction. In some embodiments, the authorization provider 112 may be a computing device operated by, or on behalf of, an issuer entity; the issuer entity having issued access credentials used in the transaction. In some embodiments, the authorization provider 112 may make an initial authorization decision based on details of the transaction. However, in the event that the authorization provider 112 determines that the transaction should be declined, the authorization provider 112 may then assess the context data to determine whether the decline is a false decline and whether the transaction should be approved anyway.

A supplemental device 114 may be any electronic device capable of obtaining context data and conveying the context data to another electronic device. Context data may be obtained by the supplemental device 114 via one or more sensors of the supplemental device. In some embodiments, one or more supplemental devices 114 may be configured to report context data on a periodic basis (e.g., every minute, every hour, etc.). In some embodiments, one or more supplemental devices 114 may be configured to report context data upon receiving a request for that context data. In some embodiments, one or more supplemental devices 114 may be associated with a particular user or account, a particular resource provider or access device, a particular location, or any other suitable entity. In some embodiments, upon receiving an authorization request message that pertains to a particular user, resource provider, and/or location, context information associated may be requested from a number of supplemental devices 114 associated with the particular user, resource provider, and/or location.

By way of illustrating an example transaction conducted using the system depicted in FIG. 1, consider the following scenario in which a user 102 conducts a transaction with a resource provider. In this scenario, the user 102 may present his or her user device 104 to an access device to complete the transaction. For example, the user may put his mobile phone (having installed a payment application and having NFC capabilities) within the vicinity of an access device that has an NFC reader. In this example, the access device may be a contactless reader capable of communicating with the mobile device. The access device may, upon detecting the mobile device in its vicinity, provide transaction details to the mobile device and, in return, receive access credentials to be used in completing a transaction (e.g., a payment device identifier), which may then be communicated to the resource provider computer.

Upon receiving the access credentials, the resource provider computer may generate an authorization request message for the transaction. The resource provider computer may then transmit the authorization request message to a processing provider for authorization. In this scenario, the processing provider may identify one or more supplemental devices 114 either located at the resource provider or known to be associated with the user 102 and may request from those supplemental devices 114 context data collected at a time of the transaction in the authorization request message. The processing provider may provide the authorization request message and context data to the authorization provider for approval.

Upon receiving the authorization request message, the authorization provider may determine whether to approve or decline the transaction. For this scenario, consider that the authorization provider may determine that the requested transaction is uncharacteristic of the user 102. For example, the authorization provider may determine that the transaction is for goods not typically purchased by the user, or for an amount which is not typical (e.g., much greater than) for the user. Upon determining that the transaction is uncharacteristic of the user 102, the authorization provider may determine that the transaction should be declined as there is a significant risk that the user is not the owner of the payment device. Upon making this determination, the authorization provider may then assess the context data to determine whether context data supports the transaction. For example, the supplemental devices 114 may include a biometric monitor (e.g., a Fitbit® or other monitoring device) that is known to monitor biometric information for the user 102. In this example, the authorization provider may determine whether biometric information received from the biometric monitor at the time of the transaction matches what would be expected in biometric information for a user that is conducting a transaction uncharacteristic of them. For example, a user who is characteristically frugal may become nervous or flustered when conducting a transaction for a large amount. In this example, the user having an increased heart rate at the time of the transaction (i.e., context data) may provide evidence that the user is the one conducting the transaction. In this scenario, the authorization provider may, instead of declining the transaction, elect to approve the transaction upon detecting an elevated heart rate via the supplemental device 114. It should be noted that since the supplemental device 114 is already known to be associated with the user, this prevents a fraudster from providing misleading context data to the authorization provider.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the internet), using any suitable communication protocol.

Figure 2:
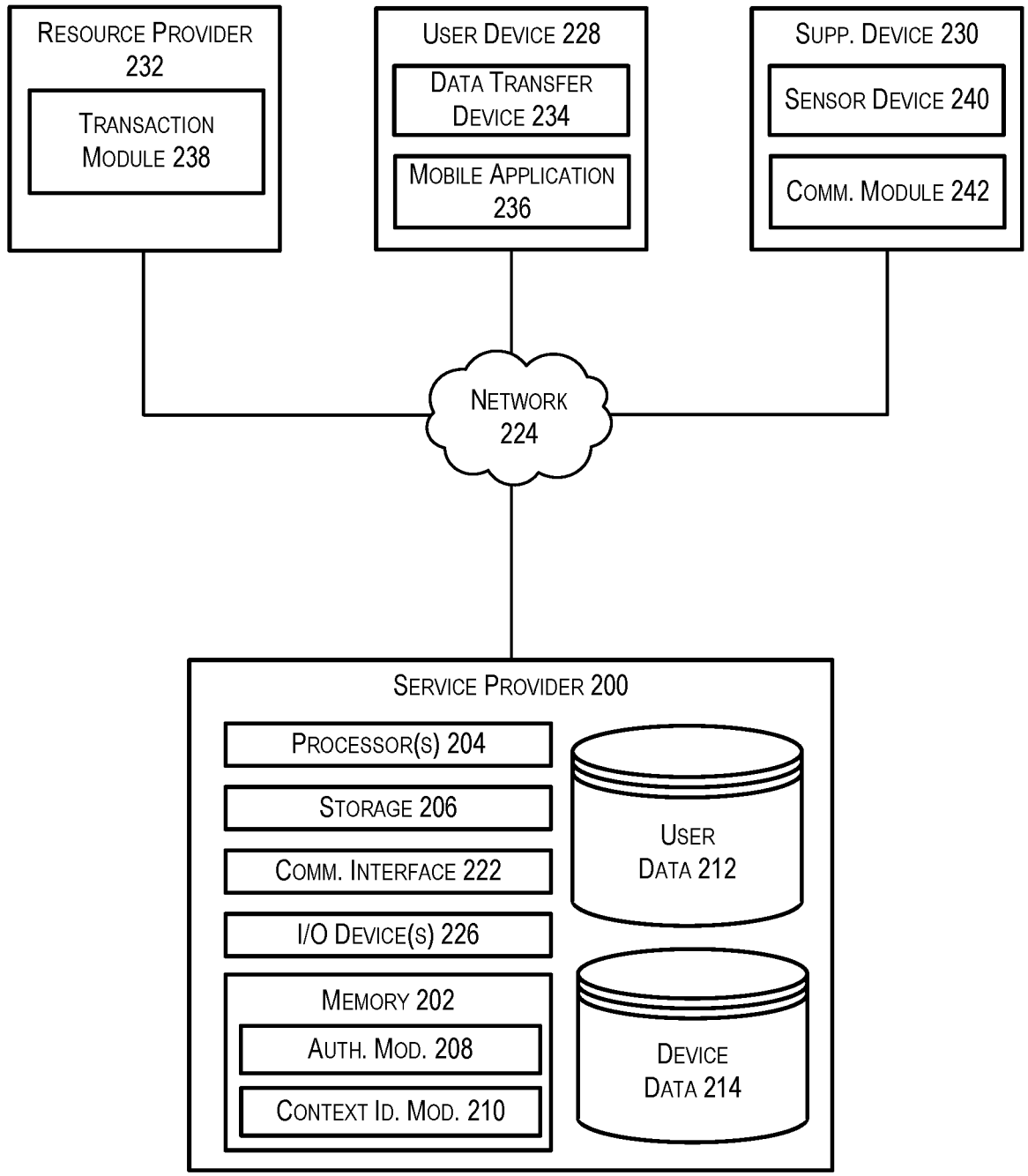
FIG. 2 depicts a diagram of an exemplary service provider computer 200 that may be configured to reduce the occurrence of false declines in transaction processing in accordance with at least some embodiments.

FIG. 2 depicts a diagram of an exemplary service provider computer 200 that may be configured to reduce the occurrence of false declines in transaction processing in accordance with at least some embodiments. The functionality attributed to the service provider computer 200 may be performed by the processing provider 110 and/or the authorization provider 112 described with respect to FIG. 1.

The service provider computer 200 may be any type of computing device capable of receiving context data and determining whether to approve a previously-declined transaction based on that context data. In at least some embodiments, the service provider computer 200 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of service provider computer 200, the memory 202 may be volatile (such as random access memory (RAM)) and/or non-volatile (such as read-only memory (ROM), flash memory, etc.). The service provider computer 200 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the service provider computer 200. In some embodiments, the memory 202 may include multiple different types of memory, such as static random access memory (SRAM), dynamic random access memory (DRAM) or ROM.

Turning to the contents of the memory 202 in more detail, the memory 202 may include an operating system and one or more application programs or services for implementing the features disclosed herein including at least a module for determining whether to approve or decline a transaction (authorization module 208) and a module for determining a level of risk for a transaction based on context data (context identification module 210). The memory 202 may also include a number of data stores, including user data 212, which maintains information associated with individual users, and/or device data 214, which may maintain information on which supplemental devices are associated with each user, resource provider, or location. In some embodiments, the service provider computer 200 may maintain one or more accounts associated with a user.

In some embodiments, the authorization module 208 may, in conjunction with the processor 204, be configured to determine whether to authorize a transaction related to an authorization request message. In some embodiments, the authorization module 208 may determine, based on historic data for a user involved in a transaction, whether the transaction is characteristic of that user. For example, the authorization module 208 may determine whether the transaction is occurring at a store, or type of store, at which the user typically shops. In another example, the authorization module 208 may determine whether the transaction is for an amount that is characteristic of the user. Based on a degree to which the transaction is deemed characteristic of the user, the authorization module 208 may determine a level of risk to be associated with the transaction. If the level of risk determined for a transaction is above an acceptable risk threshold, then the transaction may be declined. Upon determining that a transaction should be declined, the service provider 200 may execute the context identification module 210, which may cause the level of risk to be recalculated based on context data. The authorization module 208 may, in that case, approve the transaction if the level of risk, as adjusted by the context identification module 210, is below the acceptable risk threshold.

In some embodiments, the context identification module 210 may, in conjunction with the processor 204, be configured to determine whether a level of risk associated with a transaction should be adjusted based on context data for a transaction. In some embodiments, the context identification module 210 may, upon determining that a transaction has initially been declined, obtain context data from one or more supplemental devices known to be associated with the user and/or the resource provider of the transaction. The context identification module 210 may then identify a context under which the transaction has been conducted. For example, if the supplemental devices include a biometric monitor known to be worn by the user, then the context identification module 210 may determine whether biometric indicators obtained from the biometric monitor are consistent with users that make uncharacteristic purchases. In another example, if the transaction involves an online transaction conducted by user, and if the supplemental devices include a microphone placed near the user's computer, then the context identification module 210 may assess audio data collected during the time of the transaction to determine whether the transaction likely originated at the user's computer. In this example, the context identification module 210 may attempt to identify audio corresponding to keystrokes and/or mouse clicks. If obtained audio is silent, then the context identification module 210 may determine that the transaction likely did not originate at the user's computer. Upon detecting context data that supports the decline being a false decline (i.e., supports that the user conducting the transaction is the owner of the account), the context identification module 210 may adjust a level of risk associated with the transaction as calculated by the authorization module 208 described above. Upon adjusting the level of risk, the authorization module 208 may be provided the adjusted value in order to reassess whether the transaction should continue to be declined.

The data stored in databases 212 and 214 may be dynamic, static, or some combination of dynamic and static data. In some embodiments, user data 212 may include any information about users. For example, user data 212 may include demographic data, internet search history data, purchase history data, clickstream data, or any other suitable information related to the user. In some embodiments, device data 214 may include information about supplemental devices associated with various entities. For example, the device data 214 may include information about supplemental devices from which context data may be used to authorize a transaction. Upon initially determining that a transaction should be declined, the service provider computer 200 may identify within the device data 214 any supplemental devices associated with the resource provider, the user conducting the transaction, etc. Information stored in device data 214 may be provided by a resource provider, a user, a supplemental device, or any other suitable entity. Device data 214 may be populated with supplemental device data based on information received from any entity. For example, a user of a service provided by the service provider may enroll one or more supplemental devices with the service provider 200. During enrollment of those supplemental devices, details related to the devices may be stored in device data 114. In some embodiments, the device data 114 may store information needed to access information from a supplemental device (e.g., login and password, decryption keys, etc.).

The service provider computer 200 may also contain communications interface(s) 222 that enable the service provider computer 200 to communicate with a stored database, another computing device or server, one or more remote devices, and/or any other suitable electronic devices. In some embodiments, the communication interface 222 may enable the service provider computer 200 to communicate with other electronic devices on a network 224 (e.g., on a private network). The service provider computer 200 may also include input/output (I/O) device(s) and/or ports 226, such as for enabling connection with a keyboard, a mouse, a pen, a voice input device, a touch input device, a display, speakers, a printer, etc.

In some embodiments, the network 224 may include any one or a combination of many different types of networks, such as cable networks, the Internet, wireless networks, cellular networks, and other private and/or public networks. While the illustrated example depicts various electronic devices accessing the service provider computer 200 over the network 224, the described techniques may equally apply in instances where the electronic devices interact with the service provider computer 200 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

The service provider computer 200 may be in communication with a number of other electronic devices. For example, the service provider computer 200 may be in communication with user devices 228, supplemental devices 230, and/or resource providers 232. Each of the user devices 228 may be capable of interacting with the service provider computer 200 to access an account or enroll supplemental device information. Additionally, in some embodiments the user devices 228 may be capable of interacting with a resource provider 232 to complete a transaction. For example, the user devices 228 may include a web browser or other application that enables a user of the user device 228 to access a website maintained by the service provider computer 200 or resource provider 232.

The user device 228 may include one or more data transfer devices 234 capable of conveying information (e.g., payment device information) to an access device. For example, the data transfer devices 234 may include a display for presenting a machine-readable code to an access device, a contactless element for wirelessly transmitting information to the access device, or any other suitable data transfer means. In some embodiments, the user device 228 may include a mobile application 236, which may be a set of computer executable instructions (e.g. an application) which, when executed, causes the user device 228 to provide information to an access device to conduct a transaction with a resource provider. In some embodiments, a mobile application 236 may be an application which is maintained on behalf of, and supported by, the service provider computer 200 or another entity. For example, in some embodiments, the mobile application 236 may be used to initiate transactions using access credentials made available by the service provider computer 200. In some embodiments, a user device 228 may be independently capable of storing (e.g., in memory) one or more access credentials (e.g., as generated by the service provider computer 200).

In some embodiments, a resource provider 232 may be any computing device capable of providing authorization request messages to the service provider 200. In some embodiments, the resource provider 232 may be a retailer (e.g., an electronic retailer) or some other resource provider which manages access to one or more resources (goods and/or services). In some embodiments, the resource provider 232 may include, in its memory, one or more modules for conducting a transaction for a resource (transaction module 238).

In some embodiments, the service provider computer 200 may maintain an account with respect to one or more user devices 228. It should be noted that an account maintained by the service provider computer 200 for the user device 228 may be different from an account maintained by a resource provider 232 for that same user device 228. Each of an service provider computer 200 and a resource provider 232 may separately maintain information related to a user in relation to their respective accounts.

The supplemental device 230 may be any device capable of obtaining information about an environment and/or user and conveying that information to the service provider 200. In some embodiments, the supplemental device 230 may be an example of the supplemental device 114 described with respect to FIG. 1. In some embodiments, the supplemental device 230 may be an IoT device. A supplemental device 230 may include a number of sensor devices 240 configured to obtain information related to an environment in which the supplemental device is located or a user of the supplemental device 230. Sensor devices 240 may be any suitable type of sensor device, including audio devices (e.g., a microphone), imaging devices (e.g., a camera), biometric monitors (e.g., a heart rate monitor), or any other suitable sensor type. Additionally, the supplemental device 230 may include communication module 242, which provides a mechanism for the supplemental device 230 to communicate with other electronic devices (e.g., via the network 224).

Figure 3:
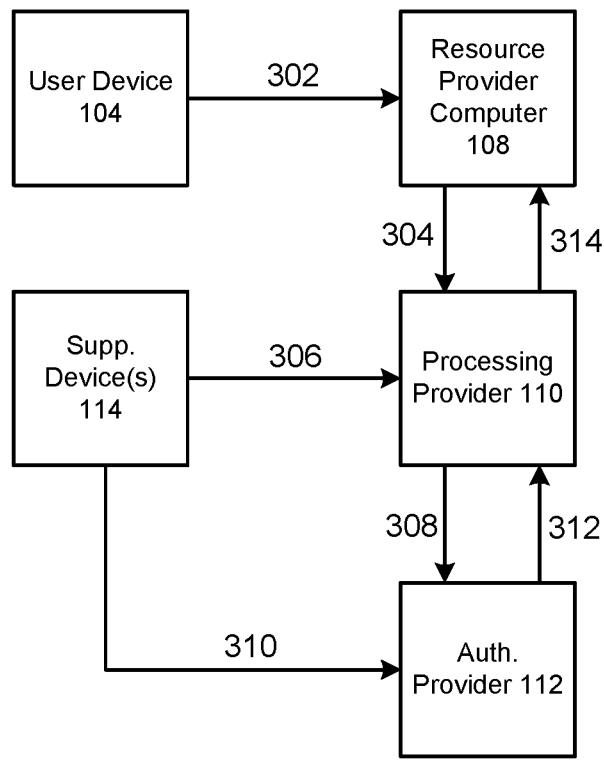
FIG. 3 depicts a flow chart illustrating an example process for providing functionality in accordance with at least some embodiments of the disclosure.

FIG. 3 depicts a flow chart illustrating an example process for providing functionality in accordance with at least some embodiments of the disclosure. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least some embodiments, the process 300 of FIG. 3 may be performed by at least a portion of the components depicted in FIG. 1. The code may be stored on a computer-readable storage medium, for example, in the form of a computer program including a plurality of instructions executable by one or more processors. The computer-readable storage medium may be non-transitory.

Process 300 may begin at 302, when a transaction is initiated at a resource provider computer 108. The transaction may be initiated via a user device 104 associated with a user. In some embodiments, the user may select one or more resources (i.e., products and/or services) to be purchased from the resource provider 108. The user device 104 may then be used to convey a payment device identifier to the resource provider computer 108 in order to complete the purchase of the selected resources.

Upon receiving a payment device identifier from the user device 104, the resource provider computer 108 may generate an authorization request message for the transaction and route that authorization request message to the processing provider 110 at 304. The processing provider 110 may assess the authorization request message in order to identify an authorization entity 112 associated with the payment device identifier used to conduct the transaction. In some embodiments, the processing provider 110 may identify the user and resource provider associated with the transaction and may determine that one or more supplemental devices 114 are capable of providing context data related to the transaction. Those supplemental devices 114 may provide that context data to the processing provider 110 in those embodiments at 306.

At 308, the processing provider 110 may convey the authorization request message to the determined authorization provider 112 at 308. In some embodiments, the processing provider 110 may also convey at least a portion of context data received from one or more identified supplemental devices 114 at 306 to the authorization provider 112 at 308. The authorization provider 112 may, upon receiving the authorization request message, determine whether to approve or decline the transaction. This may be done by first determining whether the account has a sufficient balance/line of credit to cover the transaction. Upon determining that the transaction can be covered by the account, the authorization provider 112 may determine a level of risk to be associated with the transaction. This level of risk may represent a likelihood that the requested transaction is being conducted by the actual user associated with the payment device issued by the authorization provider 112. To ascertain a level of risk for the transaction, the authorization provider 112 may look to historical data for the user, which may include (but is not limited to): resource providers typically visited by the user, amounts typically spent by the user per transaction, brands/product types typically purchased by the user, or any other suitable historical transaction data. The level of risk may then be generated based on a degree to which the current transaction is characteristic of the user based on the historical transaction data.

In some embodiments, the authorization provider 112 may, upon determining that level of risk for the transaction is greater than some threshold, provisionally decline the transaction. Upon provisionally declining the transaction, the authorization provider 112 may adjust the determined level of risk for the transaction based on context data associated with the transaction. In some embodiments, the authorization provider 112 may receive context data directly from the supplemental devices 114 at 310. For example, the authorization provider 112 may identify supplemental devices 114 associated with the user and/or the resource provider and may obtain context data from those identified supplemental devices 114 collected at the time of the transaction. In some embodiments, the authorization provider 112 may be provided context data from the supplemental devices 114 by the processing provider 110. Note that while this is discussed with respect to steps 306 and 308, the context data may be obtained from the supplemental devices 114 by the processing provider 110 and conveyed to the authorization provider 112 subsequent to the authorization provider 112 provisionally declining the transaction. Upon receiving the context data from the supplemental devices, the authorization provider 112 may determine whether any of the context data supports, or provides evidence that, the user conducting the transaction is the actual user.

The authorization provider 112 may then determine an extent or degree to which each piece of context data provides support and the level of risk may then be adjusted based on that extent or degree. In some embodiments, the extent or degree to which each piece of context data impacts the adjusted level of risk may be weighted (e.g., based on a source or the context data or other suitable factors). For example, an impact that the context data has on the level of risk may be weighted based on a type of supplemental device 114 from which the context data originated. The authorization provider 112 may then generate a new level of risk for the transaction which is adjusted based on the received context data. The authorization provider 112 may then determine whether the adjusted level of risk is above or below the threshold disclosed above. If the adjusted level of risk for the transaction is still greater than the threshold, then the authorization provider 112 may once more decline the transaction. However, if the adjusted level of risk for the transaction is now below the threshold, then the authorization provider 112 may determine that the transaction is to be approved. In some embodiments, the context data may only negatively impact the determined level of risk (i.e., increase the likelihood that the transaction will be approved).

Upon determining whether to approve or decline the transaction, the authorization provider 112 may generate an authorization response message that includes an indication as to whether the transaction should be approved or declined. This authorization response message may be provided to the processing provider 110 at 312 and may subsequently be forwarded to the resource provider computer 108 at 314.

Figure 4:
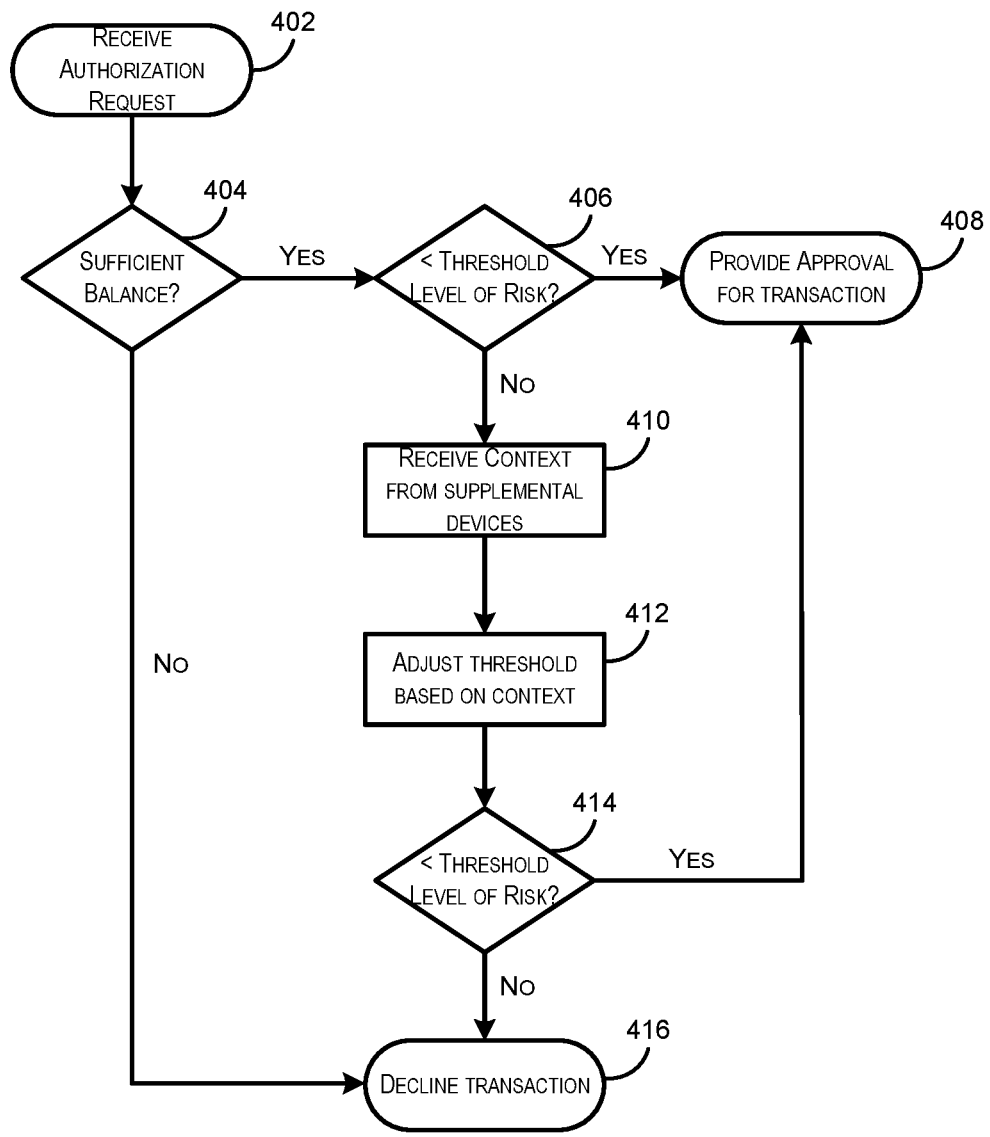
FIG. 4 depicts a flow chart illustrating an example process for reducing false declines using context data in accordance with at least some embodiments.

FIG. 4 depicts a flow chart illustrating an example process for reducing false declines using context data in accordance with at least some embodiments. The process 400 may be performed by a service provider computer 200 as depicted in FIG. 2.

The process 400 may begin at 402, when an authorization request is received by the service provider with respect to a transaction for which authorization is to be provided. As provided elsewhere, the authorization request may be generated by a resource provider involved in the transaction. The service provider may identify a user associated with the authorization request based on a payment device used to conduct the transaction.

At 404, the process 400 may involve determining whether to approve or decline the request based on whether an account used to conduct the transaction has sufficient balance and/or credit to complete the transaction. To do this, the process may involve comparing an amount associated with the transaction to an available balance and/or credit associated with the account. If the available balance and/or credit is less than the transaction amount, then the transaction is declined. Otherwise, the process 400 may proceed.

At 406, the process 400 may involve determining a level of risk to be associated with the transaction. In some embodiments, the level of risk may be determined based on demographic and/or historical data associated with a user (e.g., purchase history, consumer type, user income, etc.) In some embodiments, the level of risk for a transaction may be calculated based at least in part on the type of transaction being conducted, the resource provider with which the transaction is being conducted, the manner in which the payment device identifier was received (e.g., swiped versus hand-keyed), a time at which the transaction was conducted, or any other suitable transaction-related factor. Once a level of risk has been calculated for the transaction, that level of risk may be compared against a threshold level of risk which represents an acceptable risk for the service provider. In some embodiments, the threshold level of risk may be dynamic, in that it may vary based on the user whose account is being used to conduct the transaction. If the determined level of risk is less than or equal to the threshold level of risk, then the process 400 may involve providing approval for the transaction at 408. However, if the determined level of risk is greater than the threshold level of risk, then the process 400 may involve provisionally declining the transaction and then proceeding.

At 410, the process 400 may involve, upon determining that the transaction has been provisionally declined, receiving context data from one or more supplemental devices. In some embodiments, a set of supplemental devices may be identified by virtue of being associated with the user and/or the resource provider in the transaction. For example, consider a scenario in which the user has enrolled a biometric monitor device as well as a pair of augmented reality glasses with the service provider computer. During that enrollment, the user may have also provided a means for the service provider to communicate with each of the biometric monitor device and the pair of augmented reality glasses. For example, one or more supplemental device may periodically transmit collected data to an application server that maintains an account for the supplemental device. In this example, the user may provide login credentials for the account maintained by an application server. It should be noted that the process 400 may involve signing into an account with the application server to obtain the data rather than connecting with a supplemental device directly. In the scenario above, the process may involve contacting separate application servers associated with each of the biometric monitor device and the pair of augmented reality glasses (either simultaneously or sequentially) to obtain context data (input data collected by the respective supplemental device at the time of the transaction). This may further involve logging into the separate accounts using login credentials provided by the user (e.g., during enrollment of the supplemental device).

At 412, the process 400 may involve adjusting the determined level of risk associated with the transaction based on the received context data. This may involve identifying rulesets for processing context data based on transaction type, a type of device from which the context data was received, resource provider (or resource provider type), etc. For example, upon determining that the transaction is a "card present" transaction (i.e., an in-person transaction) conducted at a retail store, and upon determining that the transaction is uncharacteristic of the user and that the user is associated with a biometric monitor, the process may involve obtaining context data from the biometric monitor. In this example, information obtained from the biometric monitor may be compared to biometric information expected of a user which is conducting an uncharacteristic transaction in-person (e.g., elevated heart rate, increased sweat levels, etc.). In a second example, upon determining that the transaction is a "card not present" transaction (i.e., remote transaction) conducted with an online retailer, and upon determining that the transaction is uncharacteristic of the user and that the user is associated with a computer microphone, the process may involve obtaining context data (e.g., audio data) from the computer microphone. In this example, the process may involve determining whether audio collected at the time of the transaction (or shortly before the transaction) include sounds that would be attributed to keystrokes or mouse clicks. While not definitive in itself, this may indicate that the user was active on his or her computer at the time of the transaction and may increase the confidence (even if only slightly) that the user conducted the transaction. The process may involve assigning some numeric level of risk adjustment to each piece of context data based on a degree to which that context data supports that the user is the one conducting the transaction.

In some embodiments, each type of context data/supplemental device may be associated with a weighted value. For example, a first type of context data received from a first supplemental device may be weighted more or less heavily than a second type of context data received from a second supplemental device. In some embodiments, the level of risk may be adjusted based on only the context data having the highest weight. In some embodiments, the level of risk may be adjusted based on a cumulative of all of the weighted level of risk adjustment values for each of the context data obtained for the transaction. The level of risk determined for the transaction (e.g., at 406) may then be adjusted based on the weighted level of risk adjustment values determined for the context data. For example, one or more weighted level of risk adjustment values may be subtracted from the level of risk to generate an adjusted level of risk for the transaction. At 414, the process 400 may involve determining whether the adjusted level of risk for the transaction is above or below the threshold discussed at 406 above. If the adjusted level of risk for the transaction is still above the threshold, then the transaction may be declined at 416. Otherwise, the decision to provisionally decline the transaction may be retracted and the transaction may instead be approved at 408. It should be noted that the process described herein is not intended to result in increasing the occurrence of transactions being approved which should not be approved, but rather in decreasing the occurrence of transactions being declined which should not be declined. An example scenario is described with respect to FIG. 5 below.

Figure 5:
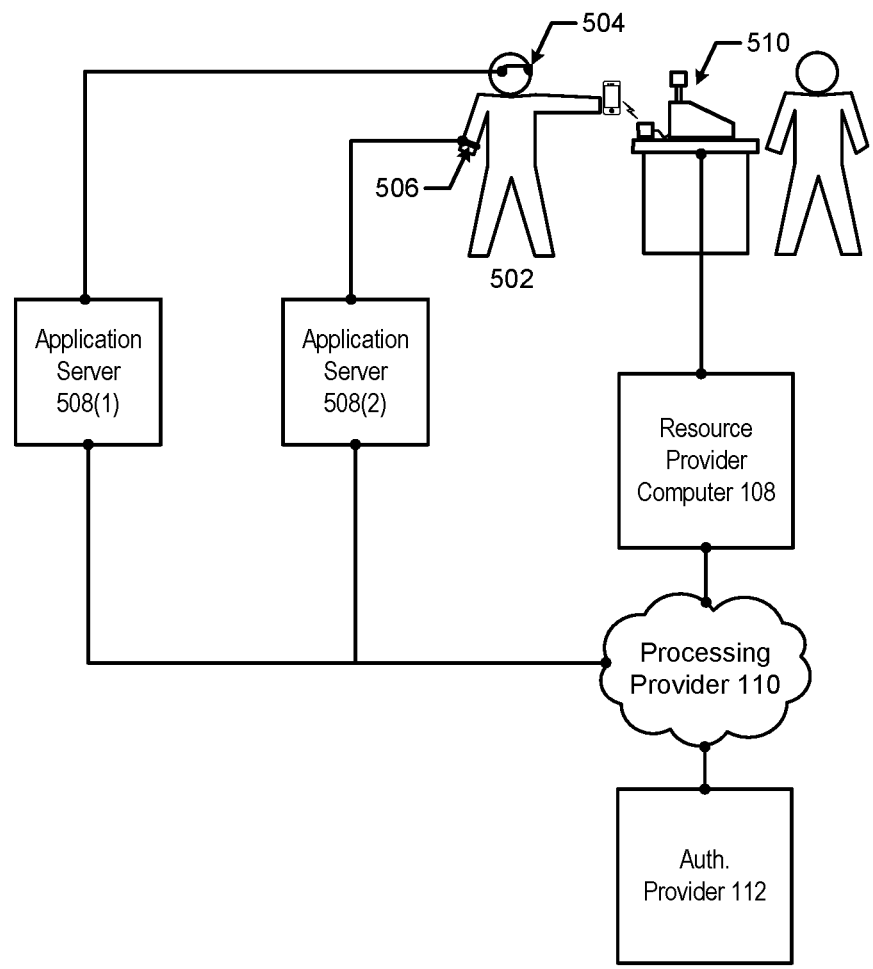
FIG. 5 depicts a block diagram for an illustrative scenario in which an example transaction is processed in accordance with the system described herein.

FIG. 5 depicts a block diagram for an illustrative scenario in which an example transaction is processed in accordance with the system described herein. In FIG. 5, an example transaction is illustrated in which a user 504 makes a purchase at a resource provider. In the example, the user is depicted as operating a pair of smart glasses 504 (an optical head-mounted display designed in the shape of a pair of eyeglasses) as well as a biomonitoring device 506 (a device for monitoring physical activity and biometric data—typically fashioned as a watch).

Each of the smart glasses 504 and biomonitoring device 506 may be examples of different supplemental devices which are capable of providing context data associated with the user to an authorization entity. Additionally, each of the smart glasses 504 and biomonitoring device 506 may transmit collected data to an application server 508 that supports that device. For example, the smart glasses 504 may be in communication with an application server 508(1) and the biomonitoring device 506 may be in communication with an application server 508(2), wherein each of application server 508(1) and application server 508(2) are operated by separate entities. Data collected by each of the smart glasses 504 and biomonitoring device 506 may be made available via accessing an account on the respective application server 508. In some cases, this may require a login/password.

In the example depicted, the user 502, prior to conducting the transaction, may have enrolled each of the smart glasses 504 and biomonitoring device 506 with the processing provider 110 and/or authorization provider 112. This may involve the user 502 providing a login/password for accounts maintained by each of the application servers 508 for the respective devices.

Prior to the transaction depicted in FIG. 5, the user 502 may use the smart glasses 504 to perform a search related to one or more products which will later become the subject of the transaction. For example, prior to attempting to purchase a particular product, the user 502 may perform a search to look up reviews, ratings, and/or a product description for a particular product offered by the resource provider. Upon determining that the product meets his or her requirements, the user may select the product for purchase.

During the transaction depicted in FIG. 5, the user 502 may present his or her payment device identifier to a point of sale (POS) device 510 of the resource provider in order to conduct the transaction. In the depicted example, the payment device identifier is depicted as being presented via a mobile phone. The POS device may then convey the transaction information and payment device identifier to a resource provider computer 108, which may subsequently generate an authorization request message for the transaction. The resource provider computer 108 may then provide the authorization request message to a processing provider 110 to initiate completion of the transaction.

Upon receiving the authorization request message, the processing provider 110 may identify the user 502 (e.g., based on the payment device identifier), the resource provider (e.g., based on a merchant identifier included in the authorization request message), and an authorization provider 112 (e.g., based on a BIN included in the payment device identifier). In some cases, upon identifying the user 502, the processing provider 110 may contact the application servers 508 (1 and 2) based on their association with the supplemental devices (504 and 506) enrolled by the user 502. The processing provider 110 may then obtain context data collected at, or around, the time of the transaction. For example, the processing provider 110 may collect search history/item recognition data from application server 508(1) and biometric information (e.g., heart rate) from application server 508(2). The processing provider 110 may route the authorization request message, as well as the context data, to the authorization provider 112.

In the example depicted, the user 502 may be shopping for an expensive gift to be given to another person. Purchasing such a gift may be uncharacteristic of the user 502 by virtue of the user not typically purchasing the type of product being purchased as well as the user not typically spending the amount that the gift costs. Because of this, the authorization provider 112 may be unsure that the user 502 is authentic and may provisionally decline the transaction. In a conventional system, the resource provider 510 would simply receive an indication (via an authorization response message) that the transaction is declined. However, as the user 502 in the depicted example is authentic, this would represent a false decline by the authorization provider 112. In accordance with embodiments of the disclosure, the authorization provider 112 would instead provisionally decline the transaction. The authorization provider 112 would then determine a degree to which the context data obtained from the supplemental devices (504 and 506) supports the authenticity of the user 502. The transaction would then be reevaluated in light of that context data. This process is described in greater detail with respect to FIG. 4 above.

In this example, the authorization provider 112 may determine that the user's search performed using the smart glasses 504 matches a product involved in the transaction. This provides significant support for the authenticity of the user 502 (i.e., the user's expressed interest in a particular product supports a subsequent purchase of that product being made by the user). Additionally, the authorization provider 112 may detect, from the context data collected by the biometric monitor 506, an increased heartrate that may be attributed to a user that is making a purchase uncharacteristic of that user (such as an expensive gift). These contextual clues may be used to decrease the perceived risk of the transaction to a point that the authorization provider 112 is able to approve the transaction that would otherwise have been declined.

The above example transaction is provided for illustrative purposes only. The example is not intended to be limiting and one skilled in the art would recognize that equivalent elements may be substituted for some of the components described. Furthermore, one skilled in the art would recognize that certain steps may be performed in a different order from the one in which they are described. It should be noted that the processing provider 110 may provide context data to the authorization provider 112 before or after an authorization request is provisionally declined. Additionally, the context data may be obtained directly by the authorization provider 112. For example, instead of the processing provider 110 contacting the application servers 508, the authorization provider 112 may do so.

Figure 6:
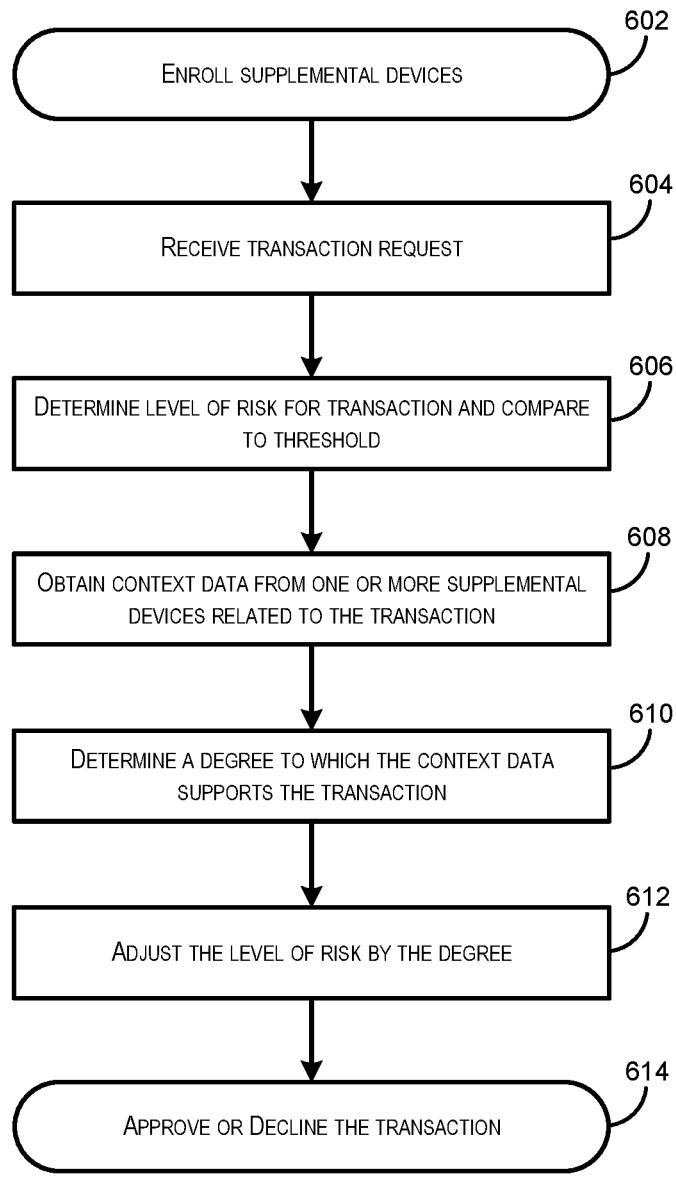
FIG. 6 depicts a flow diagram illustrating an example process for reducing false declines in accordance with at least some embodiments.

FIG. 6 depicts a flow diagram illustrating an example process for reducing false declines in accordance with at least some embodiments. In accordance with at least some embodiments, the process 600 may be performed by the service provider computer 200 depicted in FIG. 2.

Process 600 may begin at 602, when users and/or resource providers enroll one or more supplemental devices with the service provider. An association between one or more supplemental devices and the user may be established when the user enrolls the one or more supplemental devices with the service provider computer. Likewise, an association between one or more supplemental devices and a resource provider may be established when the resource provider enrolls the one or more supplemental devices with the service provider computer. In some embodiments, a supplemental device may be an IoT device or other suitable connected device.

At 604, the process 600 may involve receiving a transaction request that relates to at least one user and at least one resource provider. As discussed elsewhere, the transaction request may be an authorization request message generated by a resource provider computer.

At 606, the process 600 may involve determining a level of risk for the transaction and comparing that level of risk to a threshold level of risk value. The threshold level of risk value may represent a level of risk that the service provider is willing to undertake. A threshold level of risk may vary by service provider, since each service provider may be willing to take on a varying level of risk. In some embodiments, the level of risk for the transaction may be determined based at least in part on historical transaction data for the user. For example, details of the current transaction may be compared to details of past transactions performed by the user to determine, a likelihood that the user conducting the transaction is authentic. A level or risk may be inversely correlated to a likelihood that the user is authentic. In some embodiments, the level of risk for the transaction may also be determined based at least in part on the resource provider with whom the transaction is being conducted. For example, some resource providers may be considered less trustworthy than others. The level or risk may be inversely correlated to a trustworthiness of the resource provider.

At 608, the process 600 may involve, upon determining that the transaction should be provisionally declined, obtaining context data from one or more supplemental devices related to the transaction. As described elsewhere, the context data may include at least one of audio data, image data, biometric data, user action data, or any other suitable data related to a context. User action data may include any indication of actions previously performed by a user. For example, user action data may include data on a search (i.e., an Internet search) performed by the user or websites visited by the user. In some embodiments, user action data may include clickstream data indicating mouse clicks and other user actions.

At 610, the process 600 may involve determining a degree to which the context data supports the authenticity of the user of the transaction. The degree to which the context data supports the authenticity of the user of the transaction may be calculated as a numeric value. For example, where the level of risk is represented as a percentage likelihood that a transaction is likely to result in a disputed charge, the degree to which the context data supports the authenticity of the user may be represented as a percentage by which the level of risk may be offset. In some embodiments, the degree to which the context data supports the authenticity of the user may be weighted based on a type of supplemental device from which the context data was received.

At 612, the process 600 may involve adjusting the level of risk for the transaction based on the degree to which the context data supports the authenticity of the user. In some embodiments, this may involve subtracting a numeric value representing the degree to which the context data supports the authenticity of the user from the level of risk.

At 614, the process 600 may involve approving or declining the transaction based on the adjusted level of risk. In other words, the process 600 may involve comparing the adjusted level of risk to the threshold level of risk discussed above to determine whether the transaction should be approved or declined. Since the adjusted level of risk may be lower than the originally-determined level of risk, the transaction may be approved where it would otherwise have been declined.

Embodiments of the disclosure provide for a number of advantages over conventional systems. For example, the disclosed system provides a more comprehensive view of a transaction than conventional systems, resulting in fewer declined transactions and subsequently fewer conversions of users away from an authorization entity that uses the system. Additionally, since context data is only obtained and analyzed in the event that a transaction is provisionally declined, any additional processing requirements over conventional systems is limited to transactions that would have been declined in those conventional systems. In other words, since context data is only analyzed for transactions that would otherwise be declined (as opposed to every transaction), there is no substantial impact on the performance of the system.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an," or "the" is intended to mean "one or more," unless specifically indicated to the contrary.

What is claimed is:

1. A method comprising:
   storing, by a service provider, an association between a user and a plurality of user devices of a user, the plurality of user devices including a primary user device of the user and one or more secondary user devices of the user,
      wherein the primary user device is configured to initiate a transaction,
      wherein the one or more secondary user devices are electronic devices of the user provided near or on the user, and configured to passively collect and provide context data including at least biometric information associated with the user of the primary user device collected by the one or more secondary user devices,
   wherein the biometric information includes a heart rate of the user;
   receiving, at the service provider from a resource provider, an authorization request message associated with a transaction initiated using the primary user device with a transaction terminal of the resource provider;
   determining, based on the authorization request message, a level of risk associated with the transaction;
   determining that the level of risk is greater than a threshold value;
   determining, at the service provider, that the transaction is provisionally declined based on the level of risk being greater than the threshold value;
   upon determining that the transaction is provisionally declined and before generating and transmitting an authorization response message declining the transaction:
      receiving, by the service provider from the one or more secondary user devices, the context data that comprises input passively collected by the one or more secondary user devices at a time of the transaction, wherein the input includes at least biometric information associated with the user;
      comparing the context data including the biometric information obtained by one or more secondary user devices to reference biometric information expected of a person conducting a similar transaction;
      determining a degree to which the context data supports an authenticity of the user based on a result of comparing and a type of secondary user device from which the context data was received;

adjusting the level of risk based on the degree to which the context data supports the authenticity of the user, wherein the adjusted level of risk based on a first type of secondary user device is higher than the adjusted level of risk based on a second type of secondary user device;

approving the transaction if the adjusted level of risk is less than the threshold value;

generating the authorization response message indicating whether the transaction is approved or declined; and transmitting the authorization response message to the resource provider.

2. The method of claim 1, wherein at least one of the one or more secondary user devices is an Internet of Things (IoT) device.

3. The method of claim 1, wherein the context data further comprises at least one of audio data, image data, or user action data.

4. The method of claim 1, wherein the threshold value represents a level of risk that the service provider is willing to undertake.

5. The method of claim 1, wherein the level of risk associated with the transaction is determined based at least in part on historical transaction data for the user.

6. The method of claim 1, wherein obtaining the context data from the one or more secondary user devices comprises contacting one or more application servers associated with the one or more secondary user devices.

7. The method of claim 6, further comprising providing, by the service provider, login credentials to the one or more application servers to obtain the context data from the one or more application servers.

8. The method of claim 1, further comprising periodically obtaining the context data from the one or more secondary user devices at predetermined intervals.

9. A service provider computer comprising:
a processor; and
a memory including instructions that, when executed with the processor, cause the service provider computer to, at least:
storing an association between a user and a plurality of user devices of a user, the plurality of user devices including a primary user device of the user and one or more secondary user devices of the user,
wherein the primary user device is configured to initiate a transaction,
wherein the one or more secondary user devices are electronic devices of the user provided near or on the user, and configured to passively collect and provide context data including at least biometric information associated with the user of the primary user device collected by the one or more secondary user devices, wherein the biometric information includes a heart rate of the user;
receive, from a resource provider, an authorization request message associated with a transaction initiated using the primary user device with a transaction terminal of the resource provider;
determine, based on the authorization request message, a level of risk associated with the transaction;
determine that the level of risk is greater than a threshold value;
determine that the transaction is provisionally declined based on the level of risk being greater than the threshold value;

upon determining that the transaction is provisionally declined and before generating and transmitting an authorization response message declining the transaction:
receive, from the one or more secondary user devices, the context data that comprises input passively collected by the one or more secondary user devices at a time of the transaction, wherein the input includes at least biometric information associated with the user;
compare the context data including the biometric information obtained by one or more secondary user devices to reference biometric information expected of a person conducting a similar transaction;
determine a degree to which the context data supports an authenticity of the user based on a result of comparing and a type of secondary user device from which the context data was received;
adjust the level of risk based on the degree to which the context data supports the authenticity of the user, wherein the adjusted level of risk based on a first type of secondary user device is higher than the adjusted level of risk based on a second type of secondary user device;
approve the transaction if the adjusted level of risk is less than the threshold value;
generate the authorization response message indicating whether the transaction is approved or declined; and
transmit the authorization response message to the resource provider.

10. The service provider computer of claim 9, wherein the instructions further cause the service provider computer to maintain an association between one or more additional secondary user devices and at least one resource provider.

11. The service provider computer of claim 10, wherein the instructions further cause the service provider computer to obtain additional context data from at least one of the one or more additional secondary user devices, the at least one of the one or more additional secondary user devices comprising secondary user devices associated with a resource provider indicated in the authorization request message.

12. The service provider computer of claim 9, wherein the association between one or more secondary user devices and the user is established when the user enrolls the one or more secondary user devices with the service provider computer.

13. The service provider computer of claim 9, wherein the level of risk associated with the transaction is determined based at least in part on a resource provider associated with the transaction.

14. The service provider computer of claim 13, wherein the level of risk associated with the transaction is inversely correlated to a level of trustworthiness associated with the resource provider.

15. The service provider computer of claim 9, wherein the degree to which the context data supports the authenticity of the user comprises a numeric value by which the level of risk should be adjusted.

16. The service provider computer of claim 15, wherein adjusting the level of risk by the degree to which the context data supports the authenticity of the user comprises subtracting the numeric value from the level of risk.

17. A method comprising:
receiving, by a processor computer, an authorization request message comprising interaction data for an interaction between a first user device of a user and a resource provider;

initially determining, by the processor computer, that the interaction is uncharacteristic for the user;

determining, at the processor computer, that the interaction is provisionally declined based on the interaction being uncharacteristic for the user indicating a high level of risk;

upon determining that the interaction is provisionally declined and before generating and transmitting an authorization response message declining the interaction:

obtaining, by the processor computer, further information regarding the user, the further information collected using one or more secondary user devices of the user proximate to the user during the interaction, wherein the further information comprises a heart rate of the user;

evaluating, by the processor computer, the interaction using the further information;

comparing the further information including the heart rate obtained by the one or more secondary user devices to reference biometric information expected of a person conducting a similar transaction;

adjusting the level of risk based on a degree to which the further information supports authenticity of the user, wherein the adjusted level of risk based on a first type of secondary user device is higher than the adjusted level of risk based on a second type of secondary user device;

generating, by the processor computer, the authorization response message including an indication of approval of the interaction based on the adjusted level of risk after evaluating the further information and initially determining that the interaction is uncharacteristic for the user; and transmitting the authorization response message to the resource provider.

\* \* \* \* \*